(12) United States Patent
Uchiyama et al.

(10) Patent No.: US 12,320,428 B2
(45) Date of Patent: Jun. 3, 2025

(54) SEALING DEVICE (71) Applicant: EAGLE INDUSTRY CO., LTD., Tokyo (JP)

(72) Inventors: Tomohiro Uchiyama, Tokyo (JP); Akihiro Takahashi, Tokyo (JP); Yuki Masumi, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/018,267

(22) PCT Filed: Aug. 19, 2021

(86) PCT No.: PCT/JP2021/030382
§ 371 (c)(1),
(2) Date: Jan. 27, 2023

(87) PCT Pub. No.: WO2022/044956
PCT Pub. Date: Mar. 3, 2022

(65) Prior Publication Data
US 2023/0279951 A1    Sep. 7, 2023

(30) Foreign Application Priority Data

Aug. 28, 2020  (JP) ................. 2020-144711
Jan. 8, 2021   (JP) ................. 2021-001866

(51) Int. Cl.
*F16J 15/34* (2006.01)
(52) U.S. Cl.
CPC ............... *F16J 15/3448* (2013.01)

(58) Field of Classification Search
CPC .................................... F16J 15/3448
See application file for complete search history.

(56) References Cited

U.S. PATENT DOCUMENTS 2,329,990 A * 9/1943 Hornschuch ............ F16J 15/34
                                                 277/408
2,407,218 A * 9/1946 Beier .................... F04D 29/126
                                                 277/391

(Continued)

FOREIGN PATENT DOCUMENTS

EP    2138746 A1    12/2009
JP    2662720 B2    10/1997

(Continued)

*Primary Examiner* — Vishal A Patel
(74) *Attorney, Agent, or Firm* — Harness, Dickey & Pierce, P.L.C.

(57) ABSTRACT

A sealing device provides consistent sealing performance in applications where a rotating shaft rotates at high speed. The sealing device 10 seals an annular gap between a rotating shaft 50 and a housing 60, and includes a case 100 fixedly attached to the shaft hole, and a seal ring 200 held in the case 100 such as to be restricted from moving in a rotating direction, and to separate a high-pressure side (H) where pressure rises during use of the sealing device from an opposite low-pressure side (L). The seal ring 200 is disposed such that there is an annular gap between itself and an outer circumferential surface of the rotating shaft 50, and the annular gap is dimensioned such that a fluid pressure of a sealed fluid flowing from the high-pressure side (H) into the low-pressure side (L) causes the Lomakin effect.

10 Claims, 7 Drawing Sheets

(56) References Cited

U.S. PATENT DOCUMENTS

| | | | | |
|---|---|---|---|---|
| 2,785,913 A * | 3/1957 | Solari | F16J 15/36 | 277/391 |
| 3,554,559 A * | 1/1971 | Dahlheimer | F16J 15/36 | 277/391 |
| 3,743,304 A * | 7/1973 | Lindeboom | F16J 15/441 | 277/422 |
| 3,756,673 A * | 9/1973 | Strub | F16J 15/44 | 384/138 |
| 3,963,247 A * | 6/1976 | Nommensen | B01J 3/03 | 277/425 |
| 3,973,779 A * | 8/1976 | Burgmann | F16J 15/406 | 277/351 |
| 4,071,254 A * | 1/1978 | Raimondi | F04D 29/143 | 277/432 |
| 4,337,628 A * | 7/1982 | Greene | F16D 3/41 | 277/374 |
| 4,342,538 A * | 8/1982 | Wolford | F16J 15/36 | 415/174.3 |
| 4,429,884 A * | 2/1984 | Matsumoto | B63H 23/321 | 277/392 |
| 4,504,069 A | 3/1985 | Stenlund | | |
| 4,971,306 A | 11/1990 | Jinnouchi et al. | | |
| 5,014,999 A * | 5/1991 | Makhobey | F16J 15/441 | 277/422 |
| 5,490,682 A * | 2/1996 | Radosav | F16J 15/3488 | 277/390 |
| 5,893,564 A * | 4/1999 | Yang | F16J 15/348 | 277/374 |
| 6,962,340 B2 * | 11/2005 | Maruyama | F16J 15/3464 | 277/390 |
| 7,210,687 B2 * | 5/2007 | Takahashi | F16J 15/3404 | 277/362 |
| 7,631,878 B1 * | 12/2009 | Orlowski | F16J 15/443 | 277/421 |
| 8,302,971 B2 * | 11/2012 | Huang | F16J 15/348 | 277/390 |
| 9,068,571 B2 * | 6/2015 | Hilaris | F01D 11/025 | |
| 9,709,174 B2 | 7/2017 | Inoue | | |
| 11,168,573 B2 * | 11/2021 | Garrison | F16J 15/24 | |
| 2006/0033287 A1 | 2/2006 | Rago | | |
| 2014/0008873 A1 | 1/2014 | Inoue | | |
| 2020/0011425 A1 | 1/2020 | Tokunaga et al. | | |

FOREIGN PATENT DOCUMENTS

| | | |
|---|---|---|
| JP | H11-218231 A | 8/1999 |
| JP | 5194002 B2 | 5/2013 |
| WO | 2012/132832 A1 | 10/2012 |
| WO | 2018/155464 A1 | 8/2018 |

* cited by examiner

SEALING DEVICE

CROSS-REFERENCE TO RELATED APPLICATIONS

This application is a National Stage of International Application No. PCT/JP2021/030382, filed Aug. 19, 2021 (now WO 2022/044956A1), which claims priority to Japanese Application No. 2021-001866, filed Jan. 8, 2021 and Japanese Application No. 2020-144711, filed Aug. 28, 2020. The entire disclosures of each of the above applications are incorporated herein by reference.

FIELD

The present disclosure relates to a sealing device that seals an annular gap between a rotating shaft and a housing.

BACKGROUND

Generally, a sealing device that seals an annular gap between a rotating shaft and a housing is provided with a seal ring or the like that stays in sliding contact with the rotating shaft. Such a contact-type sealing device is applicable only to a limited range of rotation speed of the rotating shaft.

CITATION LIST

Patent Literature

[PTL 1] Japanese Patent No. 2662720

SUMMARY

Technical Problem

An object of the present disclosure is to provide a sealing device capable of providing consistent sealing performance even in applications where a rotating shaft rotates at high speed.

Solution to Problem

The present disclosure adopts the following means to achieve the object noted above.

Namely, the sealing device of the present disclosure is a sealing device that seals an annular gap between a rotating shaft and a housing having a shaft hole for the rotating shaft to pass through, the sealing device including: a case fixedly attached to the shaft hole; a seal ring held in the case such as to be restricted from moving in a rotating direction, and to separate a high-pressure side where pressure rises during use of the sealing device from an opposite low-pressure side, the seal ring being disposed such that there is an annular gap between itself and an outer circumferential surface of the rotating shaft, the annular gap being dimensioned such that a fluid pressure of a sealed fluid flowing from the high-pressure side into the low-pressure side causes the Lomakin effect.

According to the present disclosure, the annular gap formed between the seal ring and the outer circumferential surface of the rotating shaft is stably maintained owing to a self-aligning effect by a force that acts between the rotating shaft and the seal ring due to the Lomakin effect. Thus unwanted (sliding) contact between the seal ring and the rotating shaft can be prevented. The annular gap dimensioned and designed to provide the Lomakin effect can be a very small clearance and therefore the sealing device can provide the sealing function.

Preferably, the seal ring may be provided, on an inner circumferential surface thereof, with at least one of a labyrinth groove that constitutes a labyrinth seal structure, and a screw pump groove serving as a screw pump that forces the sealed fluid entering the annular gap back to the high-pressure side.

This, combined with the self-aligning effect described above, ensures consistent sealing performance. Moreover, the annular gap being maintained stably as described above means reduced impact of the rotation speed of the rotating shaft on the sealing performance.

Preferably, the seal ring may include a cylindrical surface region composed of a cylindrical surface on the inner circumferential surface thereof, at least one of the labyrinth groove and the screw pump groove being disposed on the low-pressure side with respect to the cylindrical surface region. The inside diameter in the cylindrical surface region and the inside diameter in a region provided with a labyrinth groove or a screw pump groove may be set the same, or different.

Providing such a cylindrical surface region can ensure that the Lomakin effect (self-aligning effect) is achieved more consistently and reliably.

Preferably, the sealing device may further include a vibration dampening ring disposed on the low-pressure side with respect to the seal ring inside the case, and held in the case in contact with the seal ring, with an annular gap formed between itself and the rotating shaft, an elastic ring sealing an annular gap between the case and the vibration dampening ring, and holding the vibration dampening ring in the case, and a pressing member pressing the seal ring against the vibration dampening ring.

Adopting such a configuration restricts movement of the seal ring when the rotating shaft vibrates and the seal ring attempts to move radially by the force that provides the self-aligning effect, because of friction acting between the seal ring and the vibration dampening ring. Therefore, the self-aligning effect provided by the seal ring reduces the vibration of the rotating shaft itself. Since the vibration dampening ring is held by the elastic ring, the elastic ring also provides a vibration absorbing effect, which further dampens vibration of various components. The pressing member pressing the seal ring against the vibration dampening ring prevents a gap from being formed between the seal ring and the vibration dampening ring, and thus prevents leakage of the sealed fluid from such a gap.

The seal ring should preferably be made of a material having a lower hardness than that of the vibration dampening ring. For example, the seal ring may preferably be made of a carbon material, and the vibration dampening ring may preferably be made of a metal material or a ceramic material.

The sealing device may preferably further include a holding member mounted to the case and holding the pressing member.

The configurations described above can be adopted in any possible combinations.

Advantageous Effects of the Disclosure

As described above, according to the present disclosure, consistent sealing performance can be provided even in applications where a rotating shaft rotates at high speed.

DETAILED DESCRIPTION

Hereinafter, modes for carrying out this disclosure will be illustratively described in detail based on specific embodiments with reference to the drawings. It should be noted that, unless otherwise particularly specified, the sizes, materials, shapes, and relative arrangement or the like of constituent components described in the embodiments are not intended to limit the scope of this disclosure.

Embodiment 1

Figure 1:
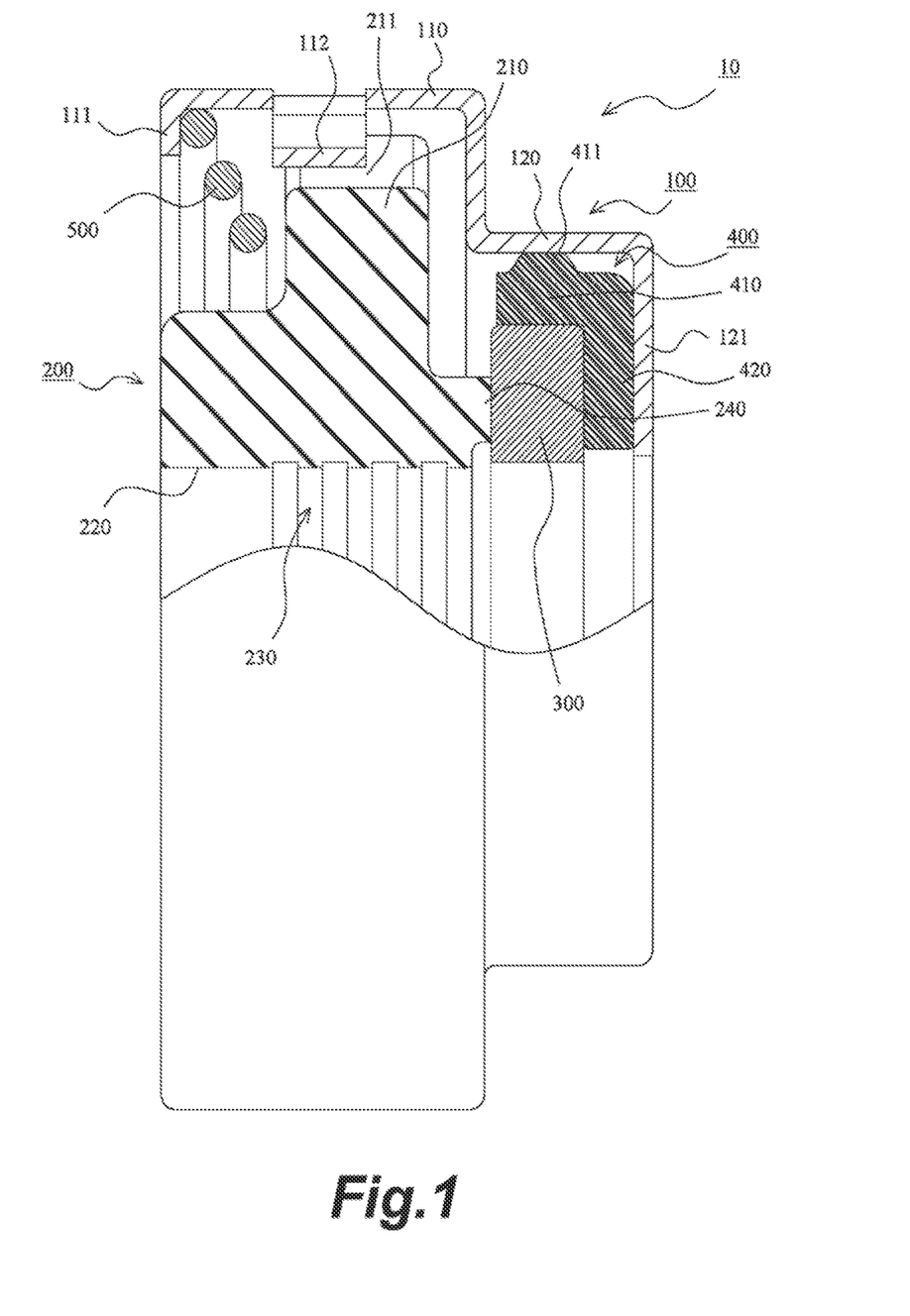
FIG. 1 is a partially broken cross-sectional view of a sealing device according to Embodiment 1 of the present disclosure.
Figure 2:
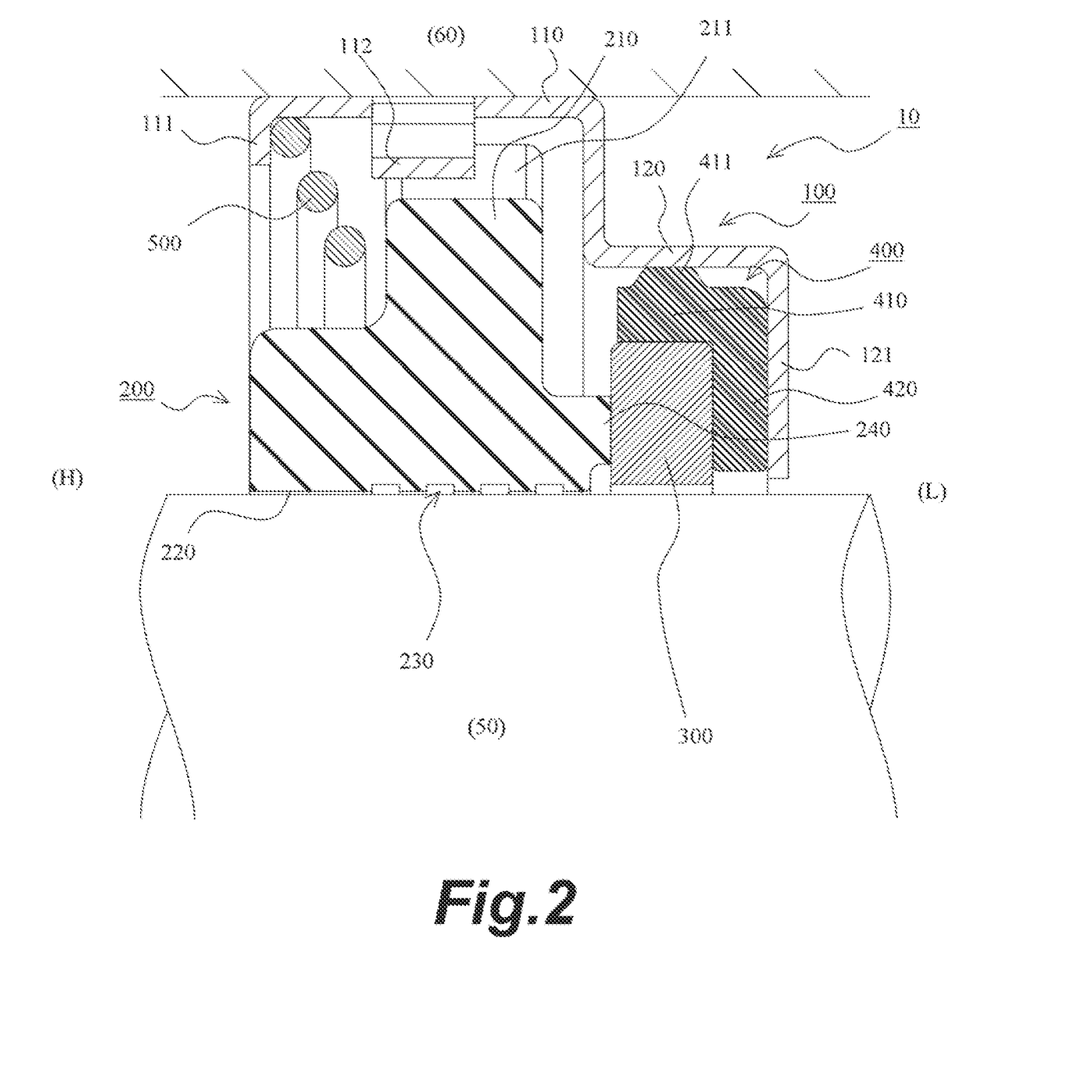
FIG. 2 is a diagrammatic cross-sectional view of a sealing structure according to Embodiment 1 of the present disclosure.
Figure 3:
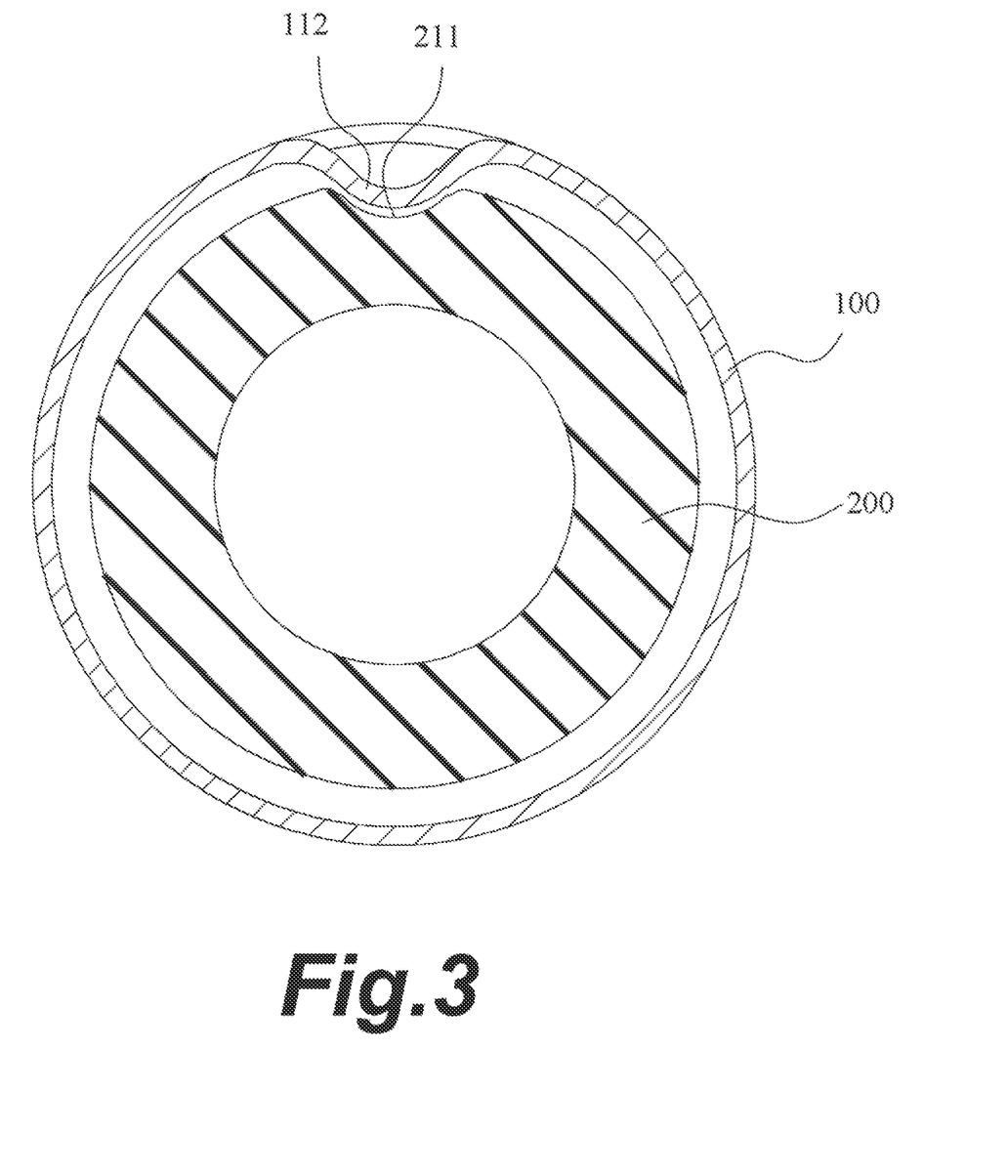
FIG. 3 is a diagrammatic cross-sectional view of the sealing device according to Embodiment 1 of the present disclosure.

A sealing device according to Embodiment 1 of the present disclosure is described with reference to FIG. 1 to FIG. 3. FIG. 1 is a partially broken cross-sectional view of a sealing device according to Embodiment 1 of the present disclosure. The upper half of the drawing shows a cross section of a part of the sealing device cut across a plane containing the center axis of the sealing device, viewed from the outer circumference of the sealing device. FIG. 2 is a diagrammatic cross-sectional view of a sealing structure according to Embodiment 1 of the present disclosure, illustrating a cross section of the sealing device across the plane containing the center axis mentioned above. FIG. 3 is a diagrammatic cross-sectional view of the sealing device according to Embodiment 1 of the present disclosure, illustrating a cross section of the sealing device across a plane perpendicular to the center axis mentioned above. The sealing device is vertically symmetrical except for some parts.

Sealing Structure

A sealing structure to which the sealing device according to this embodiment is applied is described with reference, in particular, to FIG. 2. The sealing structure according to this embodiment includes a rotating shaft 50, a housing 60 having a shaft hole for the rotating shaft 50 to pass through, and a sealing device 10 that seals an annular gap between the rotating shaft 50 and the housing 60. The sealing device 10 is fixedly attached to the housing 60 and configured such that there is a gap between itself and the rotating shaft 50. The sealing device 10 separates the annular gap between the rotating shaft 50 and the housing 60, and can prevent leakage of the sealed fluid. In FIG. 2, the sealed fluid is present on the left side of the sealing device 10 where the pressure rises during the use of the device. Hereinafter, where applicable, the left side of the sealing device 10 will be referred to as the high-pressure side (H), and the opposite side (right side) will be referred to as the low-pressure side (L). The sealing device 10 according to this embodiment may be favorably applied as a gas seal in auxiliary machines of an automobile (where the sealed fluid is a high-pressure gas).

Sealing Device

The sealing device 10 according to this embodiment is described in more detail. The sealing device 10 includes a case 100, a seal ring 200 and a vibration dampening ring 300 held in the case 100, an elastic ring 400 for holding the vibration dampening ring 300 in the case 100, and a coil spring 500 serving as a pressing member that presses the seal ring 200 against the vibration dampening ring 300. The seal ring 200 is made of a material having a lower hardness than that of the vibration dampening ring 300.

The case 100 is an annular member made of metal or the like. This case 100 includes a large-diameter part 110 anchored to an inner circumferential surface of the shaft hole in the housing 60 by press-fitting or the like, and a small-diameter part 120 disposed on the low-pressure side (L) of the large-diameter part 110 and having a smaller outside diameter than the large-diameter part 110. An inward flange 111 is provided at an end of the large-diameter part 110. An anti-rotation protrusion 112 is provided at least at one location around the circumference of the large-diameter part 110 for restricting movement of the seal ring 200 in the rotating direction. An inward flange 121 is provided also at an end of the small-diameter part 120.

The seal ring 200 is an annular member made of a carbon material or the like. This seal ring 200 is provided with an annular protruded part 210 protruding radially outward on the outer circumferential side. A recess 211 is provided on the outer circumferential surface of this annular protruded part 210 at least at one location around the circumference for the protrusion 112 on the case 100 to fit in. The protrusion 112 thus fitting in the recess 211 restricts movement of the seal ring 200 in the rotating direction. FIG. 3 illustrates a cross-sectional view of a section where the protrusion 112 is fitted in the recess 211. This drawing shows a configuration where the protrusion 112 and recess 211 are provided only at one location around the circumference. The protrusion 112 and recess 211 may be provided at a plurality of locations around the circumference.

The seal ring 200 is disposed such that there is an annular gap formed between itself and the outer circumferential surface of the rotating shaft 50. This annular gap is dimensioned such as to allow the fluid pressure of the sealed fluid flowing from the high-pressure side (H) to the low-pressure side (L) to create the Lomakin effect. The inner circumferential surface of the seal ring 200 includes a cylindrical surface region 220 that is a cylindrical surface. This cylindrical surface region 220 is provided on the high-pressure side (H) of the inner circumferential surface of the seal ring 200. On the low-pressure side (L) of the cylindrical surface region 220 on the inner circumferential surface of the seal ring 200 is provided at least one groove 230. The inside diameter between adjacent grooves 230 may be equal to the inside diameter of the cylindrical surface region 220 as shown in FIG. 1 and FIG. 2, or these inside diameters may be different from each other. The groove 230 is configured as at least one of a labyrinth groove that has a labyrinth seal structure, and a screw pump groove serving as a screw pump that forces the sealed fluid entering the annular gap mentioned above back to the high-pressure side (H). The labyrinth structure, which is a known technique, will not be described in detail. A labyrinth structure referred to as the straight-through design, for example, may be adopted. Namely, a groove of an appropriate depth provided at least at one location can create a vortex inside the groove and prevent leakage of the sealed fluid. The screw pump groove is also a known technique and will not be described in detail. At least one spiral groove, or at least one groove slanted to the axial direction can generate a dynamic pressure that pushes the sealed fluid back toward the high-pressure side (H) in accordance with the rotating direction of the rotating shaft 50.

The seal ring 200 further has an annular protruded part 240 protruding toward the low-pressure side (L). This protruded part 240 is configured to make surface contact at the distal end with the vibration dampening ring 300.

The seal ring 200 thus configured is held in the case 100 such as to be restricted from moving in the rotating direction, and disposed such as to separate the high-pressure side (H) where the pressure rises during the use of the device from the opposite low-pressure side (L), to provide the sealing function.

The vibration dampening ring 300 is a circular member made of a metal or ceramic material or the like. This vibration dampening ring 300 is disposed on the low-pressure side (L) of the seal ring 200, and held on the case 100 in contact with the seal ring 200, with an annular gap between itself and the rotating shaft 50. The vibration dampening ring 300 does not serve the purpose of sealing on the inner circumferential surface side. Therefore, as opposed to the gap between the seal ring 200 and the rotating shaft 50, the annular gap between the vibration dampening ring 300 and the rotating shaft 50 need not be very small. The surface of the vibration dampening ring 300 that makes contact with the seal ring 200 is a flat surface with a certain surface roughness so that friction resistance acts between the seal ring 200 and the vibration dampening ring 300 when the seal ring 200 vibrates, and that the sealed fluid does not leak through between the seal ring and the vibration dampening ring. Therefore, a material may be adopted as well as surface finishing may be performed for the vibration dampening ring 300 to have such a surface.

The vibration dampening ring 300 thus configured is held by the elastic ring 400, which is made of an elastic body such as rubber. This elastic ring 400 is configured to seal the annular gap between the case 100 and the vibration dampening ring 300. Namely, the elastic ring 400 includes a cylindrical part 410 disposed in a clearance between an outer circumferential surface of the vibration dampening ring 300 and an inner circumferential surface of the small-diameter part 120 of the case 100. This cylindrical part 410 includes an annular protrusion 411 on the outer circumferential surface, which makes pressure contact with the inner circumferential surface of the small-diameter part 120 when set. The elastic ring 400 also includes an inward flange 420 disposed in a clearance between end faces of the vibration dampening ring 300 and the inward flange 121 of the case 100. The vibration dampening ring 300 is held by the elastic ring 400 thus configured so that the vibration dampening ring 300 is held on the case 100, fixedly positioned both in the axial direction and the radial direction.

The coil spring 500 is made of metal or the like. This coil spring 500 is set such that one end thereof makes contact with the inward flange 111 of the case 100 while the other end thereof makes contact with an end face on the high-pressure side (H) of the annular protruded part 210 of the seal ring 200. Thus the seal ring 200 is pressed toward the low-pressure side (L), i.e., against the vibration dampening ring 300. This provides axial positioning of the seal ring 200. The seal ring 200 is positioned radially, too, when pressed by the coil spring 500, also because of the effect of the friction resistance between itself and the vibration dampening ring 300, so that the seal ring is unlikely to shift down out of position by its own weight.

Advantages of the Sealing Device According to this Embodiment

In the sealing device 10 according to this embodiment, the annular gap formed between the seal ring 200 and the outer circumferential surface of the rotating shaft 50 is stably maintained owing to a self-aligning effect by a force that acts between the rotating shaft 50 and the seal ring 200 due to the Lomakin effect. Namely, the sealed fluid entering the annular gap from the high-pressure side (H) to the low-pressure side (L) causes a pressure drop. A deflection of the rotating shaft 50 relative to the seal ring 200 creates a portion with more clearance and a portion with less clearance in the annular gap around the circumference. The pressure drops more in the portion with more clearance, resulting in lower pressure, and the pressure drops less in the portion with less clearance, resulting in higher pressure. This creates a force that acts in the direction counteracting the deflection of the rotating shaft 50 to adjust the inclination relative to the seal ring 200, providing the self-aligning effect. Such a self-aligning effect is created as long as there is a pressure difference even when the rotating shaft 50 is not rotating.

The sealing device 10 according to this embodiment can thus prevent unwanted (sliding) contact between the seal ring 200 and the rotating shaft 50 by the Lomakin effect (self-aligning effect). The annular gap dimensioned and designed to create the Lomakin effect can be a very small clearance and therefore the sealing device can provide the sealing function.

The inner circumferential surface of the seal ring 200 is provided with at least one of a labyrinth groove and a screw pump groove. This, combined with the self-aligning effect described above, ensures consistent sealing performance. Moreover, the annular gap being maintained stably as described above means reduced impact of the rotation speed of the rotating shaft 50 on the sealing performance. Therefore, the sealing device 10 according to this embodiment can consistently provide the sealing function even in applications where the rotating shaft 50 rotates at high speed.

The inner circumferential surface of the seal ring 200 according to this embodiment includes a cylindrical surface region 220 that is a cylindrical surface. This can ensure that the Lomakin effect (self-aligning effect) is achieved more consistently and reliably. Namely, while the entire inner circumferential surface of the seal ring 200 according to this embodiment can provide the Lomakin effect, the cylindrical surface region 220 increases the reliability of the Lomakin effect, and meanwhile, the groove 230 can prevent leakage of the sealed fluid more reliably.

In addition, when the rotating shaft 50 vibrates and the seal ring 200 attempts to move radially by the force that provides the self-aligning effect in the sealing device 10 according to this embodiment, friction that acts between the seal ring 200 and the vibration dampening ring 300 restricts movement of the seal ring 200. Therefore, the self-aligning effect provided by the seal ring 200 reduces the vibration of the rotating shaft 50 itself. That is to say, the seal ring 200 attempting to move relative to the rotating shaft 50 by the force that provides the self-aligning effect is restricted from moving, so that the seal ring 200 in turn provides the self-aligning effect on the rotating shaft 50 and dampens the vibration of the rotating shaft 50.

Since the vibration dampening ring 300 is held by the elastic ring 400, the elastic ring 400 also provides a vibration absorbing effect, which further dampens vibration of various components. The coil spring 500 pressing the seal ring 200 against the vibration dampening ring 300 prevents a gap from being formed between the seal ring 200 and the vibration dampening ring 300, and thus prevents leakage of the sealed fluid from such a gap.

The longer the axial length of the inner circumferential surface of the seal ring 200, the better for enhancing the sealing performance. In this embodiment, an annular protruded part 210 is provided near the center along the axial direction of the seal ring 200, with the coil spring 500 making contact with the end face of this protruded part 210 on the high-pressure side (H). The installation space is thus efficiently utilized to make the axial length of the inner circumferential surface of the seal ring 200 as long as possible.

Embodiment 2

Figure 4:
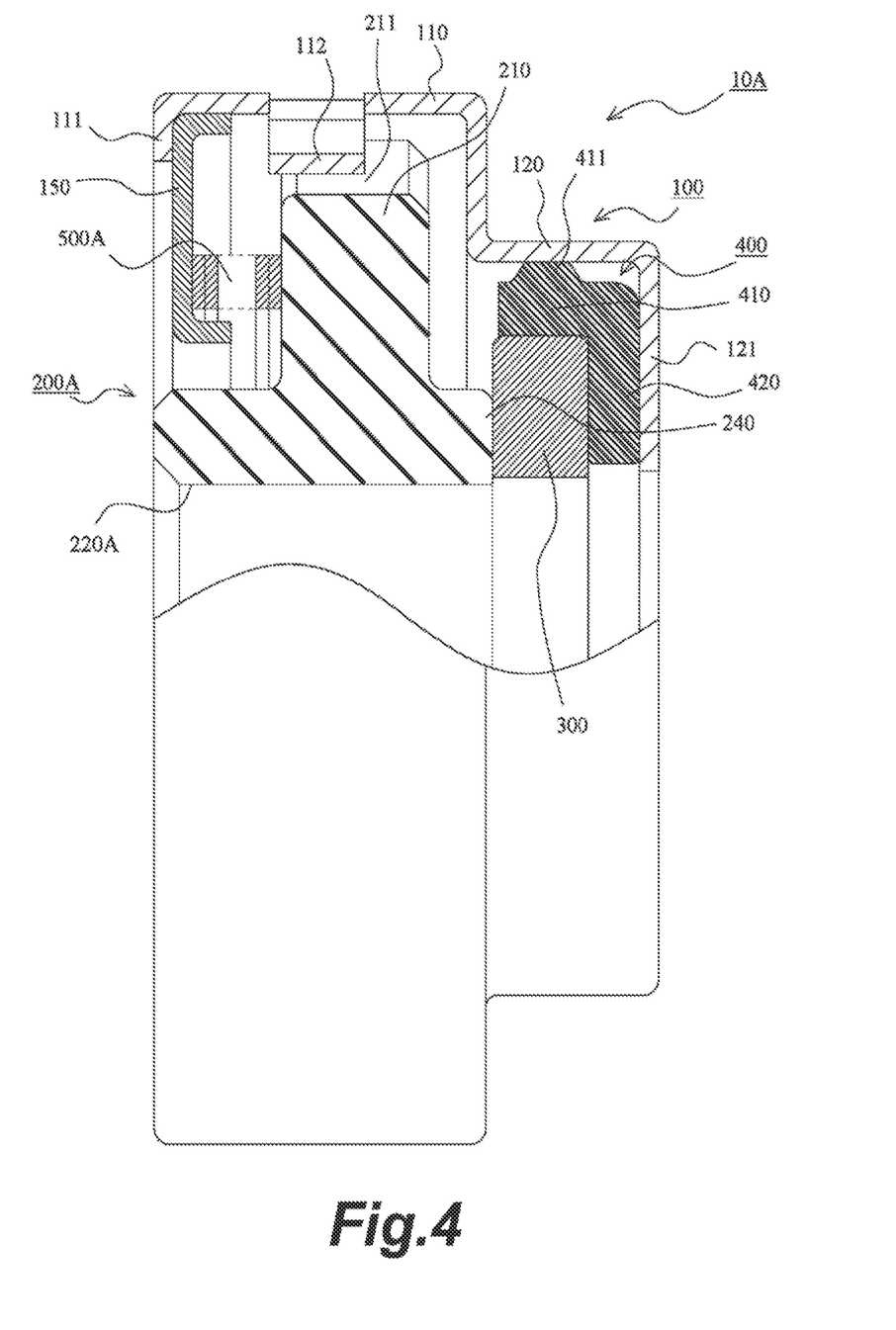
FIG. 4 is a partially broken cross-sectional view of a sealing device according to Embodiment 2 of the present disclosure.
Figure 5:
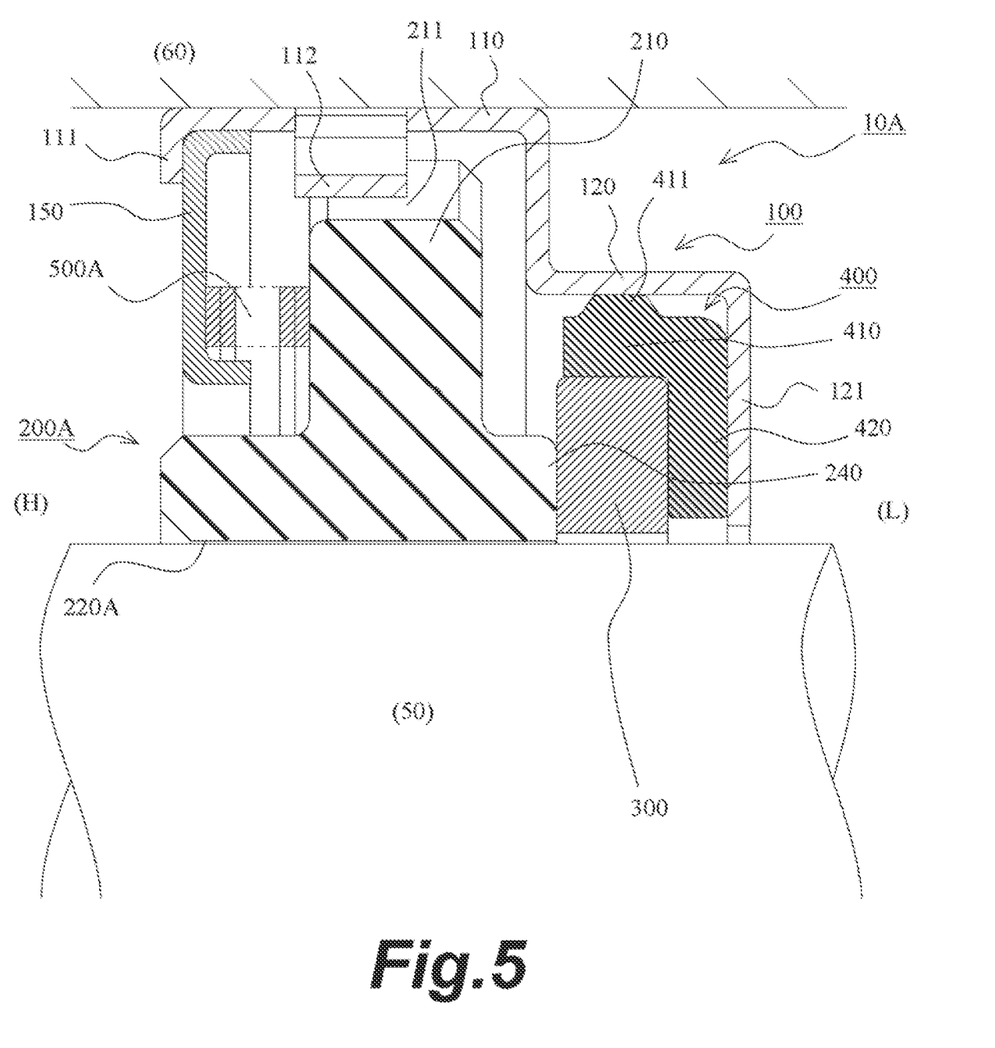
FIG. 5 is a diagrammatic cross-sectional view of a sealing structure according to Embodiment 2 of the present disclosure.

FIG. 4 and FIG. 5 illustrate Embodiment 2 of the present disclosure. Embodiment 1 described above has shown a configuration in which a groove is provided in the inner circumferential surface of the seal ring. This embodiment shows a configuration without such a groove. This embodiment also shows a configuration in which a holding member is provided for holding the pressing member. Other configurations and effects are the same as those of Embodiment 1. Same constituent elements are given the same reference numerals and will not be described again.

FIG. 4 is a partially broken cross-sectional view of a sealing device according to Embodiment 2 of the present disclosure. The upper half of the drawing shows a cross section of a part of the sealing device cut across a plane containing the center axis of the sealing device, viewed from the outer circumference of the sealing device. FIG. 5 is a diagrammatic cross-sectional view of the sealing structure according to Embodiment 1 of the present disclosure, illustrating a cross section of the sealing device across the plane containing the center axis mentioned above. The sealing device is vertically symmetrical except for some parts.

Sealing Structure

A sealing structure to which the sealing device according to this embodiment is applied is described with reference to, in particular, to FIG. 5. The sealing structure according to this embodiment includes a rotating shaft 50, a housing 60 having a shaft hole for the rotating shaft 50 to pass through, and a sealing device 10A that seals an annular gap between the rotating shaft 50 and the housing 60. The sealing device 10A is fixedly attached to the housing 60 and configured such that there is a gap between itself and the rotating shaft 50. The sealing device 10A separates the annular gap between the rotating shaft 50 and the housing 60, and can prevent leakage of the sealed fluid. In FIG. 5, the sealed fluid is present on the left side of the sealing device 10A where the pressure rises during the use of the device. Hereinafter, where applicable, the left side of the sealing device 10A will be referred to as the high-pressure side (H), and the opposite side (right side) will be referred to as the low-pressure side (L). The sealing device 10A according to this embodiment may be favorably applied as a gas seal in auxiliary machines of an automobile (where the sealed fluid is a high-pressure gas).

Sealing Device

The sealing device 10A according to this embodiment is described in more detail. The sealing device 10A includes a case 100, a seal ring 200A and a vibration dampening ring 300 held in the case 100, an elastic ring 400 for holding the vibration dampening ring 300 in the case 100, and a spring 500A serving as a pressing member that presses the seal ring 200A against the vibration dampening ring 300. The sealing device in this embodiment further includes a holding member 150 mounted to the case 100 and holding the spring 500A. The seal ring 200A is made of a material having a lower hardness than that of the vibration dampening ring 300.

The configurations of the case 100, vibration dampening ring 300, and elastic ring 400 are the same as those of the above Embodiment 1 and the description thereof will be omitted. The holding member 150 is mounted by an interference fit on an inner circumferential surface of the large-diameter part 110 such as to fit with the inward flange 111 of the case 100. The holding member 150 has a cylindrical part on the radially inner side, this cylindrical part being able to hold (determine the position of) the spring 500A.

The seal ring 200A is an annular member made of a carbon material or the like. Similarly to Embodiment 1, this seal ring 200A is provided with an annular protruded part 210 protruding radially outward on the outer circumferential side. A recess 211 is provided on the outer circumferential surface of this annular protruded part 210 at least at one location around the circumference for the protrusion 112 on the case 100 to fit in. The protrusion 112 thus fitting in the recess 211 restricts movement of the seal ring 200 in the rotating direction.

The seal ring 200A is disposed such that there is an annular gap formed between itself and the outer circumferential surface of the rotating shaft 50. This annular gap is dimensioned such as to allow the fluid pressure of the sealed fluid flowing from the high-pressure side (H) to the low-pressure side (L) to create the Lomakin effect. The inner circumferential surface of the seal ring 200A in this embodiment is composed of a cylindrical surface region 220A that is a cylindrical surface and no grooves 230 are provided as in Embodiment 1.

Similarly to Embodiment 1, the seal ring 200A further has an annular protruded part 240 protruding toward the low-pressure side (L). This protruded part 240 is configured to make surface contact at the distal end with the vibration dampening ring 300.

The seal ring 200A thus configured is held in the case 100 such as to be restricted from moving in the rotating direction, and disposed such as to separate the high-pressure side (H) where the pressure rises during the use of the device from the opposite low-pressure side (L), to provide the sealing function.

The spring 500A is made of metal or the like. This spring 500A is set such that one end thereof is held by the holding member 150 while the other end thereof makes contact with an end face on the high-pressure side (H) of the annular protruded part 210 of the seal ring 200A. Thus the seal ring 200A is pressed toward the low-pressure side (L), i.e., against the vibration dampening ring 300. This provides axial positioning of the seal ring 200A. The seal ring 200A is positioned radially, too, when pressed by the spring 500A, also because of the effect of the friction resistance between itself and the vibration dampening ring 300, so that the seal ring is unlikely to shift down out of position by its own weight.

The sealing device 10A according to this embodiment thus configured can provide similar effects as those of Embodiment 1 described in the foregoing. The lack of labyrinth grooves or screw pump grooves on the inner circumferential surface of the seal ring 200A according to this embodiment means lower sealing performance compared to the seal ring of Embodiment 1. On the other hand, the absence of grooves means lower cost for machining the seal ring 200A, and the sealing device 10A according to this embodiment can be effectively adopted for applications without high seal requirements. The Lomakin effect will be greater than Embodiment 1.

In this embodiment, the spring 500A as a pressing member can be positioned more precisely thanks to the holding member 150. In this embodiment, too, an annular protruded part 210 is provided near the center along the axial direction of the seal ring 200A, with the spring 500A making contact with the end face of this protruded part 210 on the high-pressure side (H). The installation space is thus efficiently utilized to make the axial length of the inner circumferential surface of the seal ring 200A as long as possible.

Embodiment 3

Figure 6:
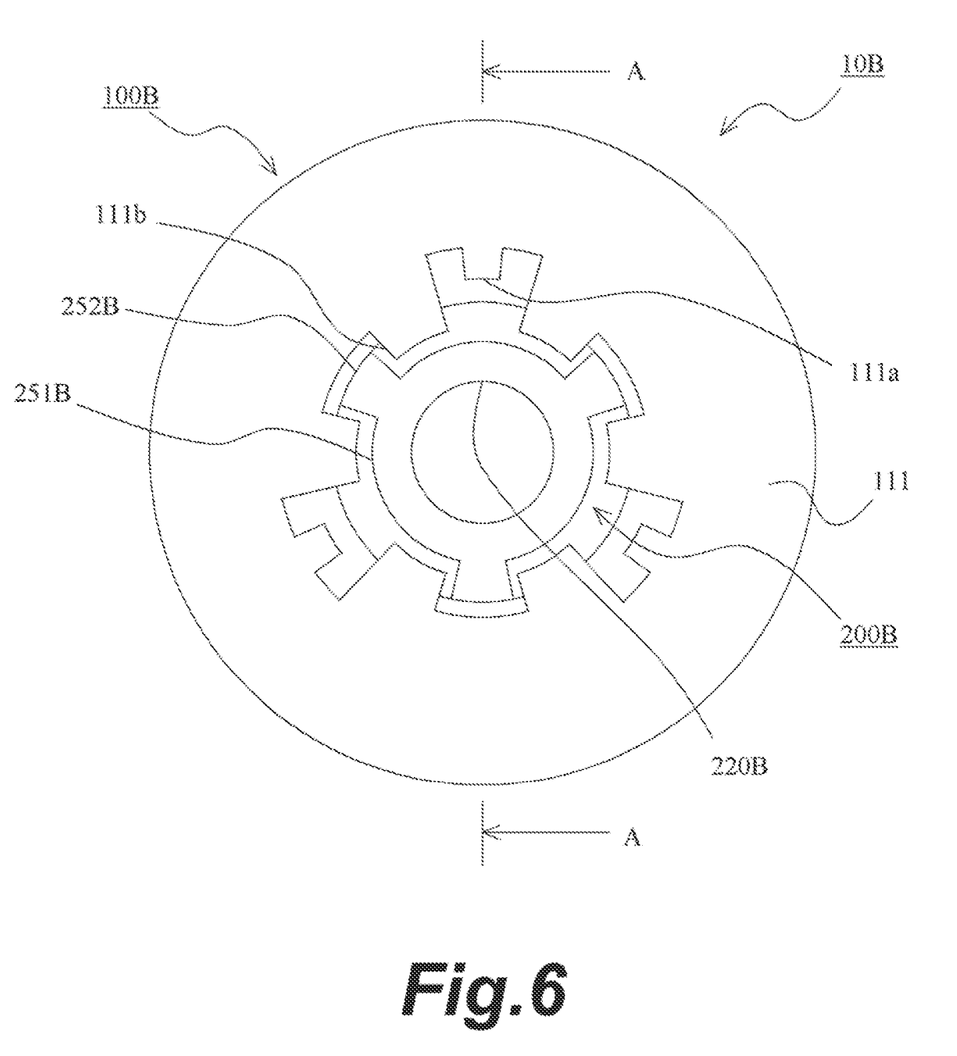
FIG. 6 is a front view of a sealing device according to Embodiment 3 of the present disclosure.
Figure 7:
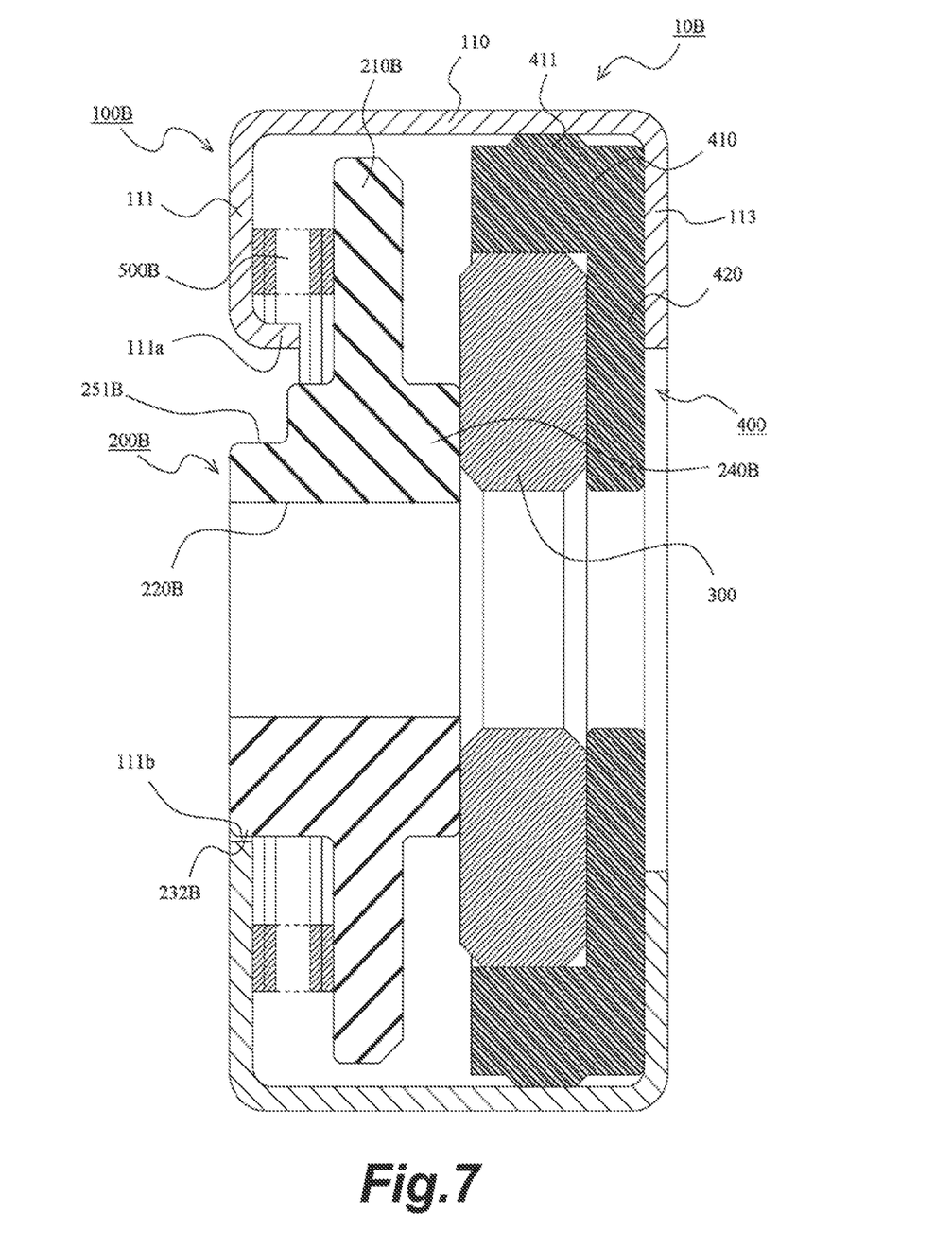
FIG. 7 is a diagrammatic cross-sectional view of the sealing device according to Embodiment 3 of the present disclosure.

FIG. 6 and FIG. 7 illustrate Embodiment 3 of the present disclosure. This embodiment shows a configuration in which the structure that restricts movement in the rotating direction of the seal ring relative to the case is different from that of the above-described Embodiment 1. This embodiment also shows a configuration in which a holding member is provided to the case for holding the pressing member. Other basic configurations and effects are the same as those of Embodiment 1. Same constituent elements are given the same reference numerals and will not be described again.

FIG. 6 is a front view of the sealing device according to Embodiment 3 of the present disclosure. FIG. 7 is a diagrammatic cross-sectional view of the sealing device according to Embodiment 3 of the present disclosure, illustrating a cross section along A-A in FIG. 6. The sealing device is vertically symmetrical except for some parts.

The sealing structure to which the sealing device 10B according to this embodiment is applied is the same as those of Embodiment 1 and Embodiment 2, i.e., the sealing device 10B is fixedly attached to the housing 60 and configured such that there is a gap between itself and the rotating shaft 50.

The sealing device 10B according to this embodiment will now be described. The sealing device 10B includes a case 100B, a seal ring 200B and a vibration dampening ring 300 held in the case 100B, an elastic ring 400 for holding the vibration dampening ring 300 in the case 100, and a spring 500B serving as a pressing member that presses the seal ring 200B against the vibration dampening ring 300. The seal ring 200B is made of a material having a lower hardness than that of the vibration dampening ring 300.

The configurations of the vibration dampening ring 300 and elastic ring 400 are the same as those of the above Embodiment 1 and the description thereof will be omitted.

The case 100B is an annular member made of metal or the like similarly to the foregoing embodiments. This case 100B includes a cylindrical large-diameter part 110 anchored to an inner circumferential surface of the shaft hole in the housing 60 by press-fitting or the like. Unlike the previous embodiments, the case 100B has no small-diameter part in this embodiment. The case 100B in this embodiment has inward flanges 111 and 113, one each at one end and the other end of the large-diameter part 110. The sealing device 10B is disposed inside an annular gap between the rotating shaft 50 and the housing 60 such that the inward flange 111 faces the high-pressure side (H) and the inward flange 113 faces the low-pressure side (L) during use.

In this embodiment, at the distal end of the inward flange 111 of the case 100B, there are provided bent portions 111a at three locations. These bent portions 111a serve to hold the spring 500B. Namely, this embodiment adopts a structure wherein the holding member 150 shown in Embodiment 2 is integrated to the case 100B. Moreover, in this embodiment, at the distal end of the inward flange 111 of the case 100B, there are provided anti-rotation notches 111b at three locations for restricting movement in the rotating direction of the seal ring 200B.

The seal ring 200B is an annular member made of a carbon material or the like. Similarly to Embodiment 1, this seal ring 200B is provided with an annular protruded part 210B protruding radially outward on the outer circumferential side, and an annular protruded part 240B protruding toward the low-pressure side (L) where the pressure is lower during use. This protruded part 240B is configured to make surface contact at the distal end with the vibration dampening ring 300 similarly to the previous embodiment.

The seal ring 200B according to this embodiment is further provided with recesses 251B at three circumferentially spaced apart locations on the opposite side from the protruded part 240B. Protruding portions 252B accordingly provided one each between adjacent recesses 251B fit in the notches 111b at three locations at the distal end of the inward flange 111 of the case 100B, so that the seal ring 200B is restricted from moving in the rotating direction relative to the case 100B.

In this embodiment, too, the seal ring 200B is disposed such that there is an annular gap formed between itself and the outer circumferential surface of the rotating shaft 50. This annular gap is dimensioned such as to allow the fluid pressure of the sealed fluid flowing from the high-pressure side (H) to the low-pressure side (L) to create the Lomakin effect. The inner circumferential surface of the seal ring 200B in this embodiment is composed of a cylindrical surface region 220B that is a cylindrical surface and no grooves 230 are provided as in Embodiment 1.

The seal ring 200B thus configured is held in the case 100B such as to be restricted from moving in the rotating direction, and disposed such as to separate the high-pressure side (H) where the pressure rises during the use of the device from the opposite low-pressure side (L), to provide the sealing function.

The spring 500B is made of metal or the like. This spring 500B is set such that one end thereof is held by the bent portions 111a of the inward flange 111 of the case 100B while the other end thereof makes contact with an end face on the high-pressure side (H) of the annular protruded part 21B of the seal ring 200B. Thus the seal ring 200B is pressed toward the low-pressure side (L), i.e., against the vibration dampening ring 300. This provides axial positioning of the seal ring 200B. The seal ring 200B is positioned radially, too, when pressed by the spring 500B, also because of the effect of the friction resistance between itself and the vibration dampening ring 300, so that the seal ring is unlikely to shift down out of position by its own weight.

The sealing device 10B according to this embodiment thus configured can provide similar effects as those of Embodiment 1 described in the foregoing. This embodiment can also adopt a configuration with a labyrinth groove or a screw pump groove similarly to Embodiment 1 described in the foregoing.

REFERENCE SIGNS LIST 10, 10A, 10B Sealing device
50 Rotating shaft
60 Housing
100, 100B Case
110 Large-diameter part
111 Inward flange
111a Bent portion
111b Notch
112 Protrusion
113 Inward flange
120 Small-diameter part
121 Inward flange
150 Holding member
200, 200A, 200B Seal ring
210, 210B Protruded part
211 Recess
220, 220A, 220B Cylindrical surface region
230 Groove
240, 240B Protruded part
251B Recess
252B Protruding portion
300 Vibration dampening ring
400 Elastic ring
410 Cylindrical part
411 Annular protrusion
420 Inward flange
500 Coil spring
500A Spring

The invention claimed is:

1. A sealing system, comprising:
a housing having a shaft hole;
a rotating shaft extending through the shaft hole in the housing;
a case attached to the shaft hole and provided on an inner circumferential side of the shaft hole and surrounding the shaft, wherein an axial extent of the case is attached to the shaft hole and entirety of the case resides axially inside the shaft hole of the housing;
a seal ring held in the case such as to be restricted from moving in a rotating direction relative to the case, and to separate a high-pressure side where pressure rises during use of the sealing device from an opposite low-pressure side;
a pressing member disposed within the case and between the case and the seal ring and directly biasing the seal ring against a vibration dampening ring, the vibration dampening ring being disposed within the case;
wherein an annular gap is formed between the seal ring and an outer circumferential surface of the rotating shaft by a fluid pressure of a sealed fluid flowing from the high-pressure side into the low-pressure side,
wherein the vibration dampening ring is disposed on the low-pressure side with respect to the seal ring inside the case, and held in the case in contact with the seal ring, with an annular gap formed between itself and the rotating shaft,
the sealing device further comprising an elastic ring sealing an annular gap between the case and the vibration dampening ring, and holding the vibration dampening ring in the case, wherein the elastic ring has a cylindrical part radially between the case and an outer surface of the vibration dampening ring and the elastic ring further includes an inward flange axially between the case and the vibration dampening ring.

2. The sealing device according to claim 1, wherein the seal ring is provided, on an inner circumferential surface thereof, with at least one of a labyrinth groove that constitutes a labyrinth seal structure, and a screw pump groove serving as a screw pump that forces the sealed fluid entering the annular gap back to the high-pressure side.

3. The sealing device according to claim 2, wherein the seal ring includes a cylindrical surface region composed of a cylindrical surface on the inner circumferential surface thereof, at least one of the labyrinth groove and the screw pump groove being disposed on the low-pressure side with respect to the cylindrical surface region.

4. The sealing device according to claim 1, wherein the seal ring is made of a material having a lower hardness than that of the vibration dampening ring.

5. The sealing device according to claim 4, wherein the seal ring is made of a carbon material, and the vibration dampening ring is made of a metal material or a ceramic material.

6. The sealing device according to claim 1, further comprising a holding member mounted to the case and holding the pressing member.

7. A sealing system, comprising:
a housing having a shaft hole;
a rotating shaft extending through the shaft hole in the housing;
a case attached to the shaft hole and provided on an inner circumferential side of the shaft hole and surrounding the shaft, the case including a first inward flange on one end and a second inward flange on a second end, the first inward flange having a plurality of anti-rotation notches, wherein an axial extent of the case is attached to the shaft hole and entirety of the case resides axially inside the shaft hole of the housing;
a seal ring held in the case such as to be restricted from moving in a rotating direction relative to the case, and to separate a high-pressure side where pressure rises during use of the sealing device from an opposite low-pressure side, the seal ring including a plurality of protruding portions with the plurality of anti-rotation notches of the case received therebetween;
a pressing member disposed within the case and between the case and the seal ring and directly biasing the seal ring against a vibration dampening ring, the vibration dampening ring being disposed within the case;
wherein an annular gap is formed between the seal ring and an outer circumferential surface of the rotating shaft by a fluid pressure of a sealed fluid flowing from the high-pressure side into the low-pressure side,
wherein the vibration dampening ring is disposed on the low-pressure side with respect to the seal ring inside the case, and held in the case in contact with the seal ring, with an annular gap formed between itself and the rotating shaft,
the sealing device further comprising an elastic ring sealing an annular gap between the case and the vibration dampening ring, and holding the vibration dampening ring in the case, wherein the elastic ring has a cylindrical part radially between the case and an outer surface of the vibration dampening ring and the elastic ring further includes an inward flange axially between the second inward flange of the case and the vibration dampening ring.

8. The sealing device according to claim 7, wherein the seal ring is made of a material having a lower hardness than that of the vibration dampening ring.

9. The sealing device according to claim 8, wherein the seal ring is made of a carbon material, and the vibration dampening ring is made of a metal material or a ceramic material.

10. The sealing device according to claim 7, wherein the case further includes a plurality of bent portions and the pressing member surrounds the plurality of bent portions.

* * * * *